(12) United States Patent
Surraco et al.

(10) Patent No.: US 10,851,228 B2
(45) Date of Patent: Dec. 1, 2020

(54) FLAME-RETARDANT COMPOSITION

(71) Applicant: FSIT Services LLC, Montclair, NJ (US)

(72) Inventors: Fernando Surraco, Montclair, NJ (US); Daniel Davidson, Cochranville, PA (US)

(73) Assignee: FSIT Services LLC, Montclair, NJ (US)

( * ) Notice: Subject to any disclaimer, the term of this patent is extended or adjusted under 35 U.S.C. 154(b) by 0 days.

(21) Appl. No.: 16/521,754

(22) Filed: Jul. 25, 2019

(65) Prior Publication Data

US 2020/0032042 A1 Jan. 30, 2020

Related U.S. Application Data

(60) Provisional application No. 62/703,508, filed on Jul. 26, 2018.

(51) Int. Cl.

| | | |
|---|---|---|
| *C08L 23/12* | (2006.01) | |
| *B60H 1/00* | (2006.01) | |
| *C08K 5/00* | (2006.01) | |
| *C08K 3/22* | (2006.01) | |
| *C08L 23/20* | (2006.01) | |
| *C08K 5/12* | (2006.01) | |
| *C08K 5/52* | (2006.01) | |
| *B60H 1/22* | (2006.01) | |

(52) U.S. Cl.
CPC .............. *C08L 23/12* (2013.01); *B60H 1/00* (2013.01); *C08K 3/22* (2013.01); *C08K 5/005* (2013.01); *C08K 5/12* (2013.01); *C08K 5/52* (2013.01); *C08L 23/20* (2013.01); *B60H 2001/2278* (2013.01); *C08K 2003/2224* (2013.01); *C08L 2201/02* (2013.01); *C08L 2201/08* (2013.01); *C08L 2203/202* (2013.01); *C08L 2205/02* (2013.01)

(58) Field of Classification Search
CPC .......................... C08L 23/12; C08K 2003/2224
See application file for complete search history.

(56) References Cited

U.S. PATENT DOCUMENTS

| | | | | |
|---|---|---|---|---|
| 3,356,765 A | * | 12/1967 | Musso | ................... C08F 10/00 525/240 |
| 4,615,831 A | | 10/1986 | Kanno et al. | |
| 4,983,742 A | | 1/1991 | Yusawa et al. | |
| 5,859,109 A | | 1/1999 | Weil et al. | |
| 8,502,078 B2 | | 8/2013 | Nonaka | |
| 2002/0013392 A1 | | 1/2002 | Matsuda et al. | |
| 2004/0126542 A1 | | 7/2004 | Fujiwara et al. | |
| 2009/0098363 A1 | | 4/2009 | Herbiet et al. | |
| 2009/0226710 A1 | | 9/2009 | Herbiet et al. | |
| 2009/0314514 A1 | | 12/2009 | Galletti et al. | |
| 2010/0285313 A1 | | 11/2010 | Zhang et al. | |
| 2011/0288210 A1 | | 11/2011 | Pinnavaia et al. | |
| 2013/0078394 A1 | | 3/2013 | Taylor | |
| 2013/0220667 A1 | | 8/2013 | Perez et al. | |
| 2013/0253105 A1 | | 9/2013 | Shan | |
| 2014/0135440 A1 | | 5/2014 | Noh et al. | |
| 2015/0010755 A1 | | 1/2015 | Fu et al. | |
| 2016/0032078 A1 | | 2/2016 | Torchia et al. | |
| 2017/0183475 A1 | * | 6/2017 | Zhang | ................... C08K 3/016 |

FOREIGN PATENT DOCUMENTS

| | | |
|---|---|---|
| WO | 9104294 A1 | 4/1991 |
| WO | 2007148226 A2 | 12/2007 |
| WO | 2017158446 A1 | 9/2017 |
| WO | 2017203381 A1 | 11/2017 |

OTHER PUBLICATIONS

BASF, "Industrial Coatings Technical Data Sheet Irgafors 168", Jun. 2016, 3 pages.
BASF, "Industrial Coatings Technical Data Sheet Irganox 1010", Apr. 2015, 3 pages.
J.M. Huber Corporation, "Kemgard MZM", Oct. 2015, 1 page.
Prospector, "Polybutene-1 DP8510M Polybutylene LyondellBasell Industries," Dec. 2017, 2 pages.
Prospector, "Pro-fax 8623 Polybutylene Impact Copolymer LyondellBasell Industries," Dec. 2017, 3 pages.
J.M. Huber Corporation, "Zergen 100 SP Treated Magnesium Hydroxide", Jun. 2013, 1 page.
20 Mule Team Borax, Product Data Sheet Firebrake ZB, Oct. 2011, 2 pages.

* cited by examiner

*Primary Examiner* — Vickey Nerangis

(74) *Attorney, Agent, or Firm* — Liang & Hennessey LLP; Stanley D. Liang

(57) ABSTRACT

A flame-retardant thermoplastic resin composition comprising about 20% to about 30% polypropylene; about 50% to about 65% Magnesium Hydroxide; and about 3% to about 8% polybutene. Articles of manufacture made by this composition and methods making these articles of manufacture.

4 Claims, 8 Drawing Sheets

FLAME-RETARDANT COMPOSITION

TECHNICAL FIELD

This disclosure relates, inter alia, to a flame-retardant composition, articles of manufacture comprising it, and methods of making the articles of manufacture.

BACKGROUND

In several industries, including the construction industry, it is highly desirable to provide a highly flame-retardant article of manufacture for discrete products installed in air handling spaces, plastic connectors in heating, ventilation, and air conditioning (HVAC) duct assembly, plastic plenum conduits, etc. In case of fire, these articles of manufacture should be sufficiently flame retardant, for safety reasons.

SUMMARY

This disclosure provides a flame-retardant (low smoke) thermoplastic resin composition comprising about 20% to about 30% polypropylene; about 50% to about 65% magnesium hydroxide; and about 3% to about 8% polybutene.

In other aspects, this disclosure provides an article of manufacture comprising a disclosed flame-retardant thermoplastic resin composition.

In yet other aspects, this disclosure provides method of making a flame-retardant article of manufacture, comprising preparing a product using a disclosed flame-retardant composition.

Numerous other aspects are provided in accordance with these and other aspects of the invention. Other features and aspects of the present invention will become more fully apparent from the following detailed description and the appended claims.

DETAILED DESCRIPTION

Figure 1:
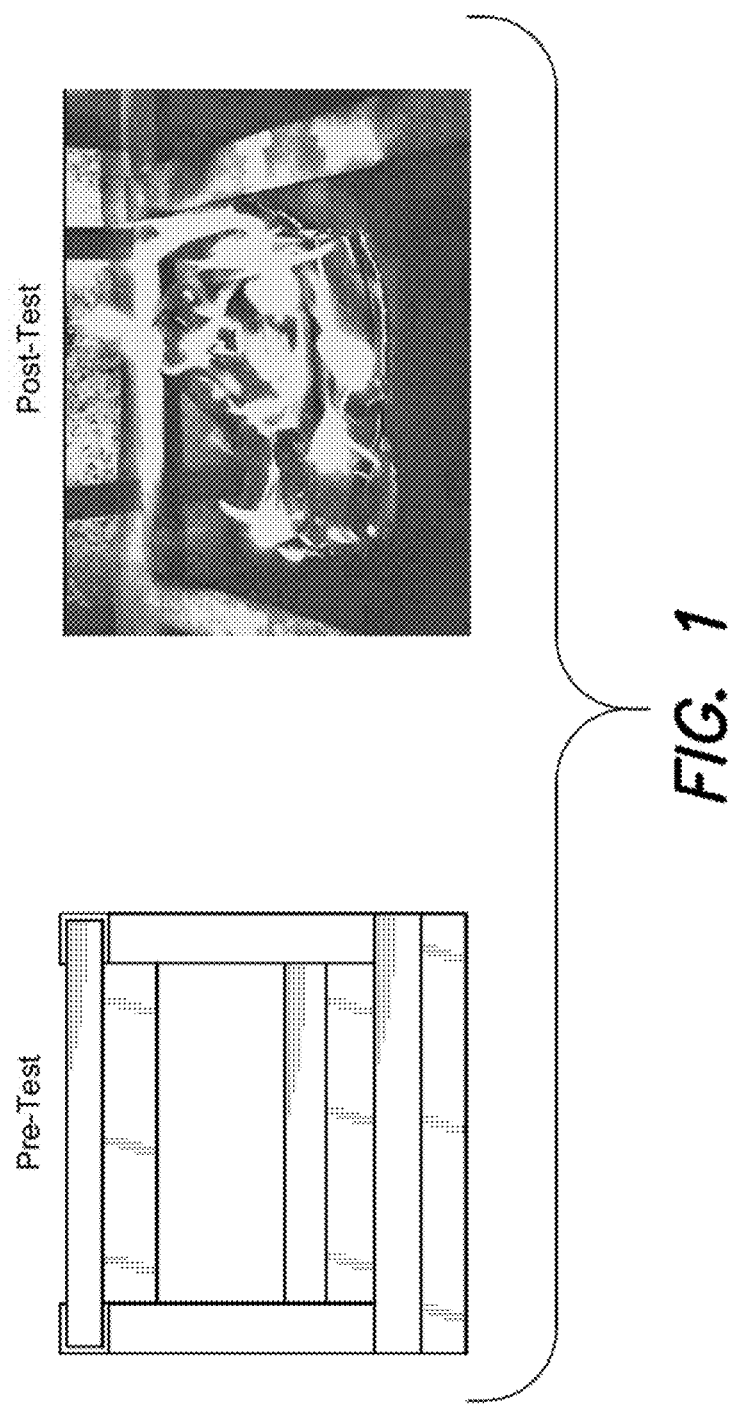
FIG. 1 shows an article of manufacture (a plastic channel) subjected to the flame test described in UL 2043. The sample was positioned on fine wire mesh and situated above the center of the test burner. The sample was placed vertically and horizontally. The sample was still burning with wispy smoke at the conclusion of the test.

As used herein, the word "a" or "plurality" before a noun represents one or more of the particular noun.

For the terms "for example" and "such as," and grammatical equivalences thereof, the phrase "and without limitation" is understood to follow unless explicitly stated otherwise. As used herein, the term "about" is meant to account for variations due to experimental error. All measurements reported herein are understood to be modified by the term "about," whether or not the term is explicitly used, unless explicitly stated otherwise. As used herein, the singular forms "a," "an," and "the" include plural referents unless the context clearly dictates otherwise.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Unless otherwise noted or otherwise clear in context to a person of ordinary skill in the art, all % herein are weight to weight (w/w).

The terms "article of manufacture" and "product," and the like (for example, "article," "compound," etc.), are used interchangeably herein.

The terms "composition" and "formulation" are used interchangeably herein.

International Mechanical Code (IMC) broadened the application of the UL 2043 Standard for Fire Test for Heat and Visible Smoke Release for Discrete Products Installed in Air-Handling Spaces. UL 2043 requirements address the concern for contribution to the smoke density or flame propagation by the equipment during a fire. Products complying with UL 2043 must have demonstrated the following characteristics:

a. A peak rate of heat release of 100 kW or less
b. A peak normalized optical density of 0.50 or less
c. An average normalized optical density of 0.15 or less.

This disclosure provides a flame-retardant thermoplastic resin composition comprising about 20% to about 30% polypropylene; about 50% to about 65% magnesium hydroxide; and about 3% to about 8% polybutene.

The polypropylene may be any suitable polypropylene polymer from any suitable source. An example of a suitable polypropylene is LyondellBasell Pro-fax 8623 polypropylene impact copolymer, from LyondellBasell industries, Wilmington, Del., USA.

The polybutene may be any suitable polybutene from any suitable source. Examples of suitable polybutene are LyondellBasell DP8310M PB-1 and LyondellBasell DPM8510M, both from LyondellBasell industries, Wilmington, Del., USA. Polybutene-1 grade LyondellBasell DPM8510M is a random copolymer of butene-1 with ethylene content.

The magnesium hydroxide may be any suitable magnesium hydroxide from any suitable source. An example of suitable magnesium hydroxide is Zerogen® 100 SP.

In certain embodiments, the flame-retardant composition further comprises one or more heat stabilizers. In further embodiments, the one or more heat stabilizers are Tris(2,4-ditert-butylphenyl)phosphite or pentaerythritol tetrakis(3-(3,5-di-tert-butyl-4-hydroxyphenyl)propionate. Other flame retardants may be added to the composition. In certain embodiments, the composition further comprises Zinc Borate (in certain embodiments, 10-20% of zinc borate). Yet other heat stabilizers may be added to the composition. In certain embodiments, the composition further comprises Irganox® 1010 (Ciba Specialty Chemicals or BASF), a phenolic primary antioxidant for processing and long-term thermal stabilization (in certain embodiments, 0.3% Irganox® 1010). Irganox® 1010 has the chemical composition of pentaerythritol tetrakis(3-(3,5-di-tert-butyl-4-hydroxyphenyl)propionate). Yet other heat stabilizers may be added to the composition. In certain embodiments, the composition further comprises Irgafos® 168 (BASF). Irgafos® 168 has the chemical composition of Tris(2,4-di-tert-butylphenyl)phosphite. In certain embodiments, the composition comprises 0.3% Tris(2,4-ditert-butylphenyl) phosphite.

In some embodiments, the composition comprises a multifunctional boron-based fire retardant (e.g., Firebrake® ZB). The chemical and physical properties of Firebrake® ZB are: boric oxide, $B_2O_3$ 48.05%; zinc oxide, ZnO 37.45%; water of crystallization, $H_2O$ 14.50%; anhydrous equivalent 85.50%;

Characteristics (typical values): refractive index 1.58 Median particle size: ZB 7 microns (Sedigraph) 9 microns (Laser diffraction), ZB-Fine 3 microns (Sedigraph) 3 microns (Laser diffraction); solubility: less than 0.28% in water at room temperature; stability: thermally stable up to 290° C.; hydrolyzable by strong acids and bases; specific gravity: 2.77.

In certain embodiments, the composition does not comprise one or more of melamine, novoloc, poly(phenylene ether), an ethylene/1-octene copolymer, grafted maleic anhydride polyolefin, and propylene-ethylene copolymer.

In some embodiments, the flame-retardant composition consists essentially of about 20% to about 30% polypropylene; about 50% to about 65% magnesium hydroxide; and about 3% to about 8% polybutene.

The disclosed flame-retardant composition may be made by methods known in the art. For examples, the ingredients of a particular composition may be compounded—the process of combining and mixing ingredients to create a formulation.

This disclosure also provides an article of manufacture comprising a disclosed flame-retardant thermoplastic resin composition. In some embodiments, the article of manufacture is a plastic connector in heating, ventilation, and air conditioning (HVAC) duct assembly or a plastic plenum conduit, wherein said article of manufacture has the following characteristics: a. a peak rate of heat release of 100 kW or less; b. a peak normalized optical density of 0.50 or less; and c. an average normalized optical density of 0.15 or less. In other embodiments, the article of manufacture is an insulated cable, an insulated electric wire, or a wiring harness, wherein said article of manufacture has the following characteristics: a. a peak rate of heat release of 100 kW or less; b. a peak normalized optical density of 0.50 or less; and c. an average normalized optical density of 0.15 or less. The article of manufacture complies with UL 2043.

This disclosure also provides a method of making a flame-retardant article of manufacture, comprising preparing a flame-retardant article of manufacture using the disclosed flame-retardant composition. In some embodiments, the article of manufacture is a plastic connector in heating, ventilation, and air conditioning (HVAC) duct assembly or a plastic plenum conduit, wherein said article of manufacture has the following characteristics: a. a peak rate of heat release of 100 kW or less; b. a peak normalized optical density of 0.50 or less; and c. an average normalized optical density of 0.15 or less. In other embodiments, the article of manufacture is an insulated cable, an insulated electric wire, or a wiring harness, wherein said article of manufacture has the following characteristics: a. a peak rate of heat release of 100 kW or less; b. a peak normalized optical density of 0.50 or less; and c. an average normalized optical density of 0.15 or less. In certain embodiments, the article of manufacture complies with UL 2043.

Methods of making these articles of manufacture are known in the art. For example, extrusion may be used to make a disclosed article of manufacture. Extrusion is a process used to create objects of a fixed cross-sectional profile. A material (such as the disclosed composition) is pushed through a die of the desired cross-section. The two main advantages of this process over other manufacturing processes are its ability to create very complex cross-sections, and to work with materials that are brittle, because the material only encounters compressive and shear stresses. It also forms parts with an excellent surface finish.

The disclosed article of manufacture may be a discrete product installed in air handling spaces, wiring cables, electrical conductor cables, a plastic channel. The article of manufacture may be one that needs to be insulated. The disclosed article of manufacture may be thermoplastic insulations for low voltage electrical conductors.

Prior-art compositions comprising polypropylene homopolymer or polypropylene copolymer with high loadings of magnesium hydroxide, for example, 40% to 70% by weight, or even 60% to 70% by weight, have physical properties of being very brittle, and less flammable. The disclosed composition comprises a combination of ingredients resulting in a composition that can be extruded and injection molded into useful articles. For example, a prior-art composition comprising polypropylene copolymer and 60% magnesium hydroxide provides a brittle material and yields an extrusion compound composition with very porous structure. Articles produced from this prior-art composition would not be practical and useful for commercial applications.

However, articles of manufacture, materials, and compounds produced from the disclosed composition provide products that can be extruded and/or molded into useful articles of commercial significance. The Examples below show compounds produced that provided a material that was extruded into a "U" channel on a commercial extruder. These compounds were not brittle, but flexible enough to provide a useful article for a connector application in an HVAC duct. Furthermore, this U channel was tested according to the flammability test of UL 2043, and showed passing results, with very little smoke.

EXAMPLES

For this invention to be better understood, the following examples are set forth. These examples are for purposes of illustration only and are not be construed as limiting the scope of the invention in any manner.

Example 1: A Failed Extrusion Trial

Composition:
Polypropylene Impact Copolymer Exxon 7623 33.8%
Zerogen® 100 SP (Mg Hydroxide FR) 55%
Kemguard MZM (smoke suppressant) 11%
Irganox® 1010 0.2%
This composition was compounded and the melt flow of this material was quite low, (0.58), reflecting the addition of large quantities of powdered ingredients as flame retardant. Extrusion trials on this material showed that this compound could not be run due to large amounts of porosity. This was probably due to the very low melt flow (very high melt viscosity) causing polymer and/or filler degradation. This compounding run produced the physical property data shown in Table 1.

TABLE 1

| Test | Test Method | Units | Specification(s) | Results |
|---|---|---|---|---|
| Specific Gravity | TI-02-01 | g/cm³ | Report | 1.476 |
| Melt Flow Index | TI-02-08 (230° C. @ 2.16 Kg) | g/10 min. | Report | 0.58 |
| Pellet Count | TI-02-05 | pellets/gram | Report | 31 |
| Tensile @ Break | ASTM D638 Type 4 | PSI | Report | 2,608 |
| Elongation @ Break | ASTM D638 Type 4 | % | Report | 0.04 |
| Ash | TI-02-09 | % | TBD | 47.19 |
| % Moisture | TI-02-03 | % | ≤0.10 | 0.001 |

Example 2: Polybutene Rescues the Failed Formulation of Example 1

After the unsuccessful extrusion trial of the formulation of Example 1, it was decided to run another compounding trial by changing the formulation with the addition of a polymeric low molecular weight material known as polybutene. The addition of polybutene may raise the melt flow (lower melt viscosity) so as to produce a compound that is easily extruded (desired melt flow for extrusion grade material is in the range of 2 to 4). The polybutylene was added at 7 wt % to obtain an extrusion grade of material. Increase melt flow upwards from 0.58.

Composition:
ExxonMobil PP7623 25.4%
LyondelBasell PB-1 8510 7% (polybutene-1)
Zerogen® 100 SP 60%
Firebrake® ZB-XF ZnBorate 7%
Irganox® 1010 0.3%
Irgafos® 168 0.3%

This compounding run produced the physical property data shown in Table 2. The melt flow was determined to be 13.8, which is more suited for injection molding rather than extrusion (extrusion grade materials should be in the range of 2-4). The Zn Borate was substituted for the MZM as being a better char former and smoke suppressant than the MZM. Also Irgafos® 168, which is a phosphite stabilizer, was added to provide a better level of stabilization. Although the addition of PB 8510 did raise the melt flow (decrease the melt viscosity), it was deemed too drastic a change and further experimental work was deemed necessary to dial in the melt flow to the 2-4 range.

TABLE 2

| Test | Test Method | Units | Specification(s) | Results |
|---|---|---|---|---|
| Specific Gravity | TI-02-01 | g/cm³ | Report | 1.520 |
| Melt Flow Index | TI-02-08 (230° C. @ 2.16 Kg) | g/10 min. | Report | 13.6 |
| Pellet Count | TI-02-05 | pellets/gram | Report | 30 |
| Tensile @ Break | ASTM D638 Type 4 | PSI | Report | 2,250 |

TABLE 2-continued

| Test | Test Method | Units | Specification(s) | Results |
|---|---|---|---|---|
| Elongation @ Break | ASTM D638 Type 4 | % | Report | 6.73 |
| Ash | TI-02-09 | % | TBD | 48.28 |
| % Moisture | TI-02-03 | % | ≤0.10 | 0.005 |

Example 3: Further Tinkering

A small batch mixing lab compounder was used to dial in the melt flow to obtain the desired 2-4 range. The polypropylene copolymer material was changed to obtain a higher impact toughness, as the previous compounds (Examples 1-2) using the Exxon polypropylene copolymer were shown to provide a very stiff and inflexible material when injection molded into tensile bars and they could be easily broken when bent by hand. The experimental run using increasing content of LyondelBasell DP8510M, mixing the ingredients in a Haake static bowl mixer equipped with rotor blades, at a compounding temperature of 250-270° C., so as to melt mix all ingredients thoroughly. The individual batches were discretely removed from the mixer, allowed to cool and solidify, and then granulated again to provide powder material which could be tested by the Melt Index machine using Method ASTM D1238. Results in the 2-4 range were desired, so as to prepare the final formulation for large scale compounding.

The results are as follows:
Number 1 was too brittle.
Number 2 was brittle and the melt was 0.88 (this was also brittle)
Number 3 was a 1.17 melt
Number 4 was a 1.30 melt and looks good. Pancake pressed out of the material could be easily folded on itself, and was not brittle.

It was thus decided to produce a large quantity of compound using Formula #4. The use of LyondellBasell Impact copolymer 8623 with a melt flow of 1.5 and no break impact at room temperature seemed to help tremendously to improve the physical properties of this formulation and practical use.

The final properties of this compound #4 are shown in Table 3. This compound was extruded into useful U channels, and made very good appearing parts.

This formulation was the final one tested for the cone calorimeter data against a commercial competitor grade (RTP company), and shown to have better heat release and very low smoke. Parts made from this compound were also tested at UL and shown to pass the requirements of UL 2043, discrete products installed in air handling spaces.

TABLE 3

| Test | Test Method | Units | Specification(s) | Results |
|---|---|---|---|---|
| Specific Gravity | TI-02-01 | g/cm³ | Report | 1.519 |
| Melt Flow Index | TI-02-08 (230° C. @ 2.16 Kg) | g/10 min. | Report | 2.3 |
| Pellet Count | TI-02-05 | pellets/gram | Report | 26 |
| Tensile @ Break | ASTM D638 Type 4 | PSI | Report | 1,704 |
| Elongation @ Break | ASTM D638 Type 4 | % | Report | 2.43 |
| Ash | TI-02-09 | % | TBD | 47.32 |
| % Moisture | TI-02-03 | % | ≤0.10 | 0.003 |

Example 4: UL 2043 Testing of a Sample of a Disclosed Formulation

Sample (a disclosed article of manufacture): 589.69 grams of a plastic channel

Method:

The test was conducted in accordance with the test procedure described in UL Standard 2043, Fourth Edition, dated Oct. 2, 2013. ("Fire Test for Heat and Visible Smoke Release for Discrete Products and Their Accessories Installed in Air-Handling Spaces"). This test method is used to determine the heat release rate, smoke release and optical density of the sample.

Acceptance Criteria:

Each product specimen has the following properties:

a) The peak rate of heat release (HRRs) measured during each test is 100 kilowatts or less.

b) The peak smoke release rate (SRRs) measured during each test is 0.21 $m^2$/s or less.

c) The total smoke released (TSR) (10 minute test duration) is 75 $m^2$ or less.

These criteria do not include the contribution of the propane ignition burner.

The summary of test results is tabulated in Table 4. Pre and post-test photographs for each test are given in FIG. 1.

Figure 2:
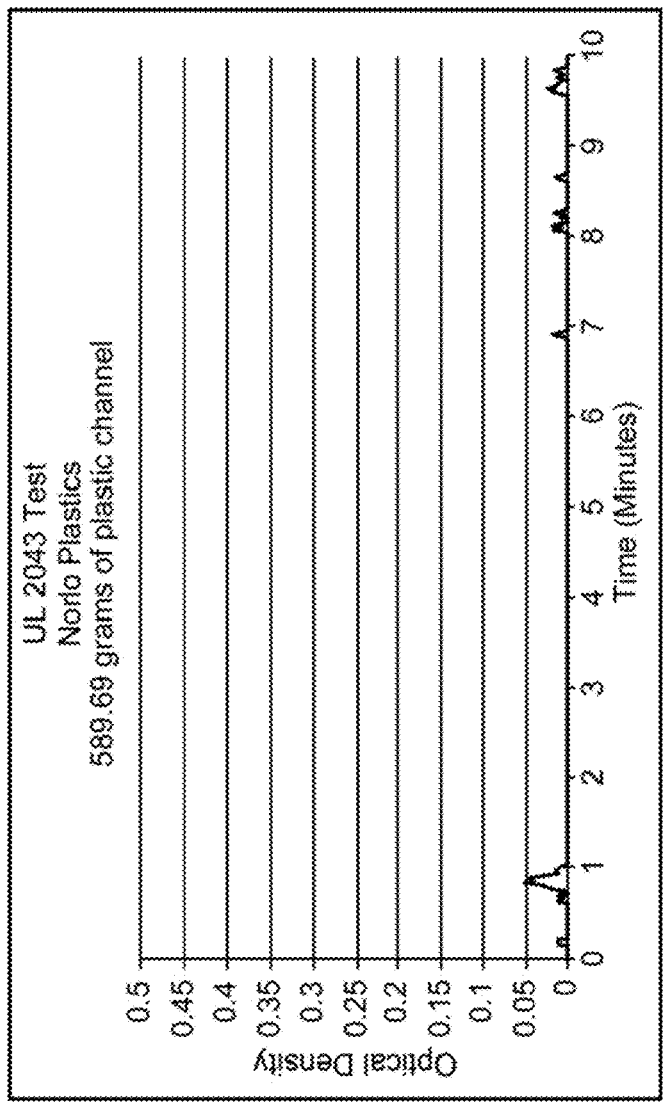
FIG. 2 shows an article of manufacture (a plastic channel) subjected to the flame test described in UL 2043 in a graph of optical density vs. time.
Figure 3:
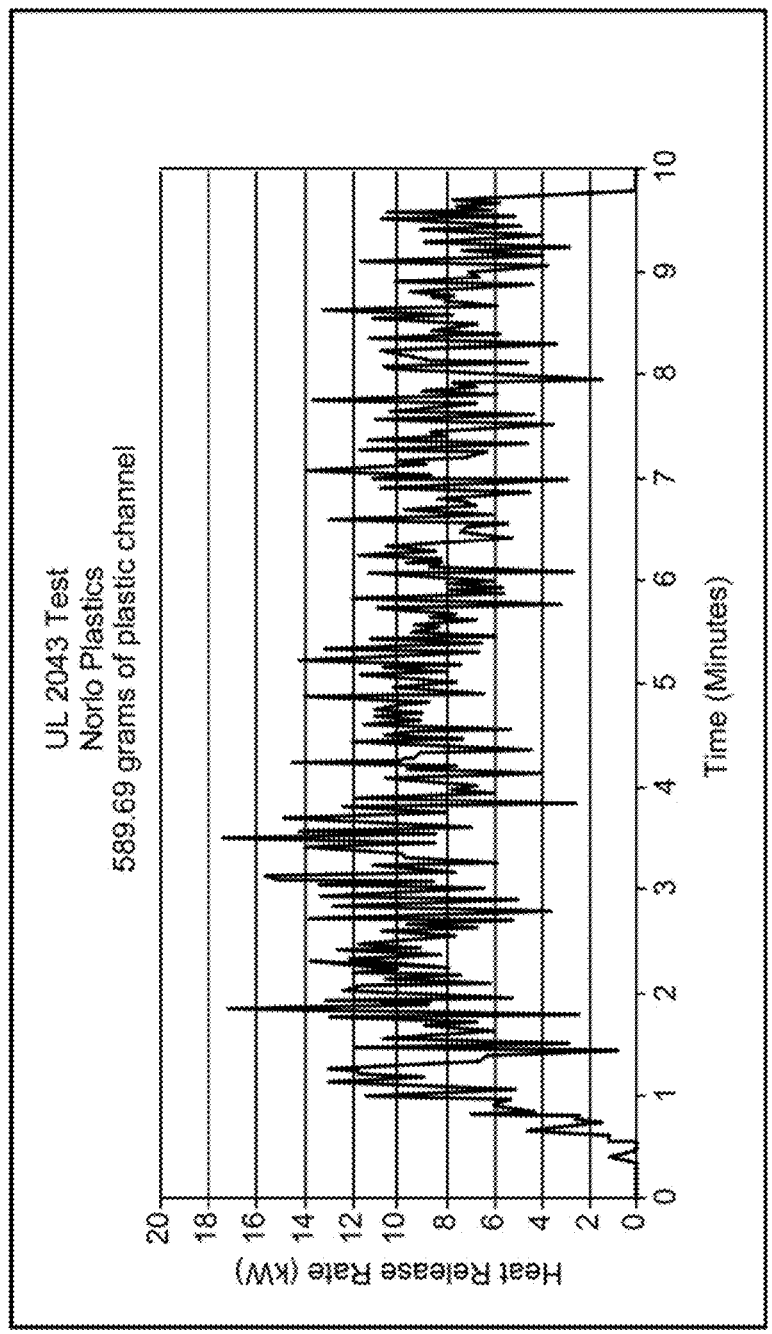
FIG. 3 shows an article of manufacture (a plastic channel) subjected to the flame test described in UL 2043 in a graph of peak heat release rate.
Figure 4:
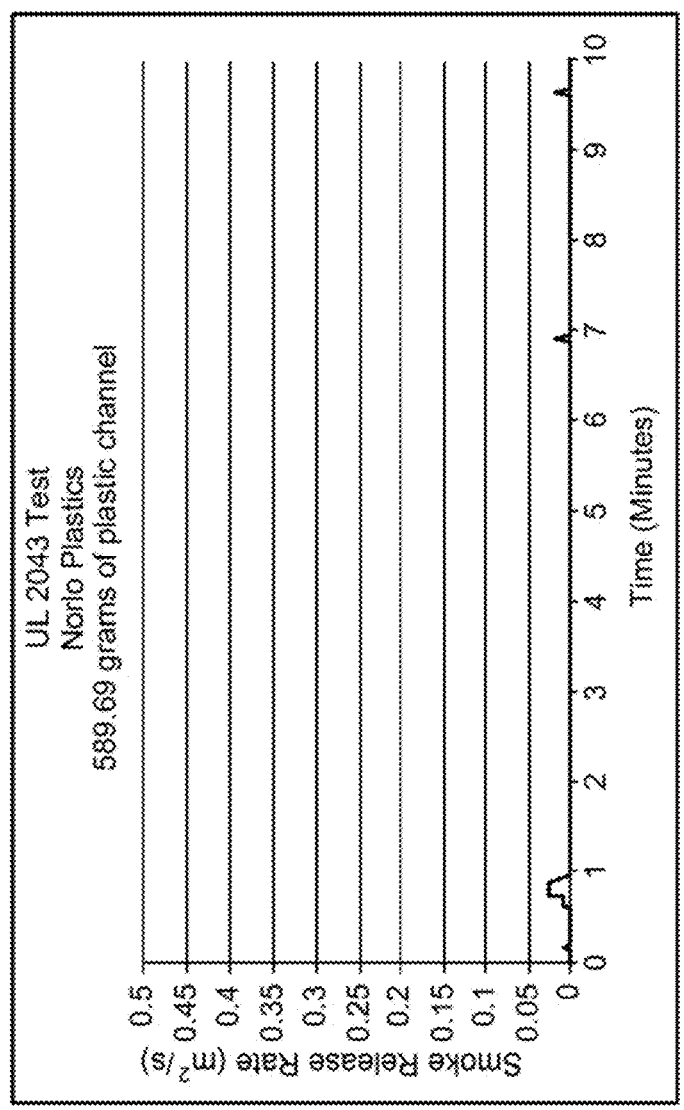
FIG. 4 shows an article of manufacture (plastic channel) subjected to the flame test described in UL 2043 in a graph of peak smoke release rate.

Graphs of heat release rate, smoke release rate, and normalized optical density are given in FIGS. 2-4.

TABLE 4

Test Results

| Sample - Test Ref. | Peak Heat Release Rate (kW) | Peak Normalized Optical Density | Average Normalized Optical Density | Peak Smoke Release Rate ($m^2$/s) | Total Smoke Released ($m^2$) |
|---|---|---|---|---|---|
| A-1 | 17 | 0.05 | <0.01 | 0.02 | 0.3 |

The values in Table 4 and in FIGS. 2-4 omit the heat and smoke contribution from the propane ignition burner.

The sample was evaluated in accordance with UL 2043 standard and it was found compliant with the standard's requirements.

The sample was positioned on fine wire mesh and situated above the center of the test burner. The sample was placed vertically and horizontally.

Post Test Observations: The sample was still burning with wispy smoke at the conclusion of the test. FIG. 1.

Example 5: Other Exemplary Disclosed Formulations

TABLE 5

An Exemplary Disclosed Composition That Passes UL-2043

|  | SG | % |
|---|---|---|
| Pro-Fax 8623 | 0.9 | 26.40% |
| LyondelBasell DP8310M PB-1 | 0.897 | 6.00% |
| Mg(OH)2 silane treated | 2.4 | 52.00% |
| Firebrake ® ZB | 3.64 | 15.00% |
| Irgnox ® 1010 | 1.15 | 0.30% |
| Irgafos ® 168 | 1.03 | 0.30% |
| Total |  | 100% |
| Calculated SG |  | 1.604 |

SG = specific gravity

| Test | Test Method | Results |
|---|---|---|
| Specific Gravity | ASTM D792 | 1.519 |
| Melt Flow Index | ASTM D1238 230 C., 2.16 kg | 2.3 |
| Pellet Count |  | 26 |
| Tensile @ Break | ASTM D638 Type 4 | 1,700 |
| Elongation @ Break | ASTM D638 Type 4 | 2.4 |
| Ash | ASTM D5630 | 47.32 |
| % Moisture |  | 0.003 |

TABLE 6

Another Exemplary Disclosed Composition

|  | SG | % |
|---|---|---|
| Pro-Fax 8623 | 0.9 | 26.40% |
| LyondelBasell DP8310M PB-1 | 0.897 | 6.00% |
| Zerogen ® 100 SP | 2.4 | 60.00% |
| Firebrake ® ZB-XF ZnBorate | 3.641 | 7.00% |
| Irgnox ® 1010 | 1.15 | 0.30% |
| Irgafos ® 168 | 1.03 | 0.30% |
| Total |  | 100% |
| Calculated SG |  | 1.575 |

Physical Property Test Results

| Test | Test Method | Units | Results |
|---|---|---|---|
| Specific Gravity | ASTM D792 | g/$cm^3$ | 1.519 |
| Melt Flow Index | ASTM D1238 230 C., 2.16 kg | g/10 min. | 2.3 |
| Pellet Count |  | pellets/gram | 26 |
| Tensile @ Break | ASTM D638 Type 4 | PSI | 1,700 |
| Elongation @ Break | ASTM D638 Type 4 | % | 2.4 |
| Ash | ASTM D5630 | % | 47.32 |
| % Moisture |  | % | 0.003 |

TABLE 7

Figure 5:
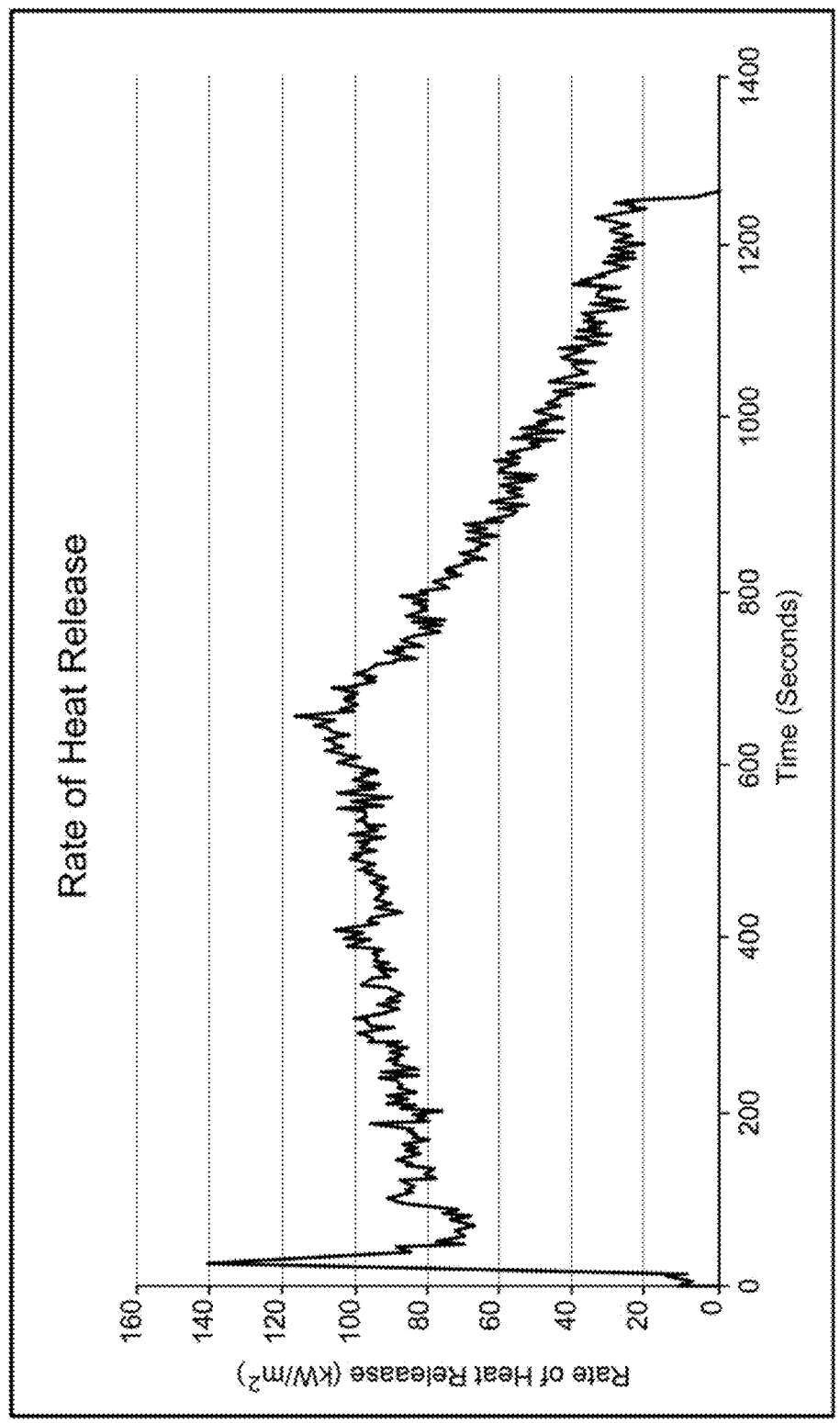
FIG. 5 shows rate of heat release of an exemplary disclosed formulation.
Figure 6:
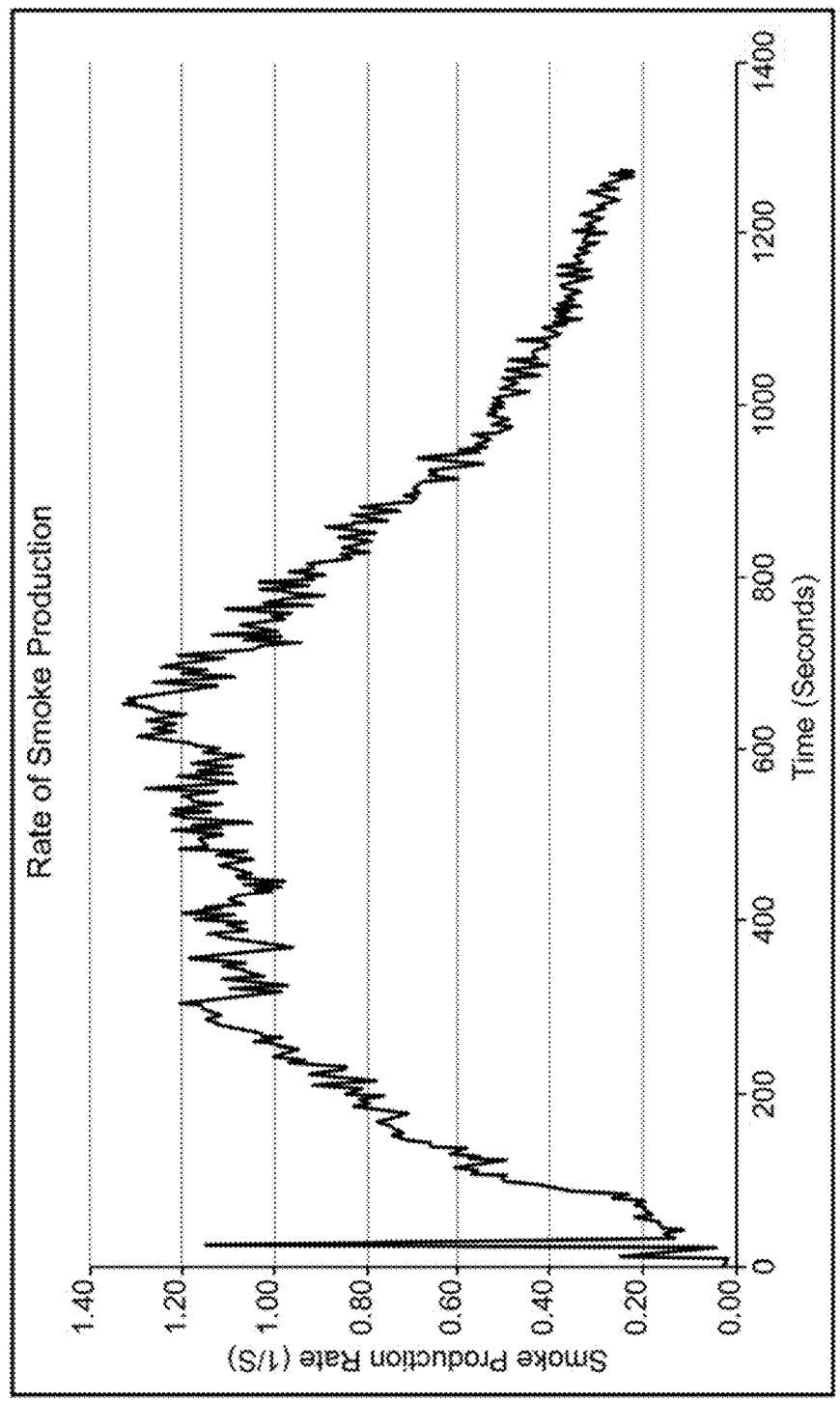
FIG. 6 shows rate of smoke production of an exemplary disclosed formulation.

Cone Calorimeter Results of a Disclosed Formulation (SEE ALSO FIGS. 5-6)

|  |  | Average of 3 Samples |
|---|---|---|
| Heat Flux | kW/$m^2$ | 50 |
| Time to Sustained Ignition | seconds | 15.5 |
| Peak Rate of Heat Release | kW/$m^2$ | 141 |
| Time of Peak RHR | seconds | 238 |
| Initial Mass | g | 35.2 |
| Final Mass | g | 8.94 |
| Avg Mass Loss Rate (10% to 90%) | g/$m^2$s | 2.5 |
| Avg SEA | $m^2$/kg | 376.51 |
| ISO 5660 Total Smoke | $m^2$/$m^2$ | 989 |
| Normalized Smoke | smk/gr | 28.1 |

TABLE 8

Figure 7:
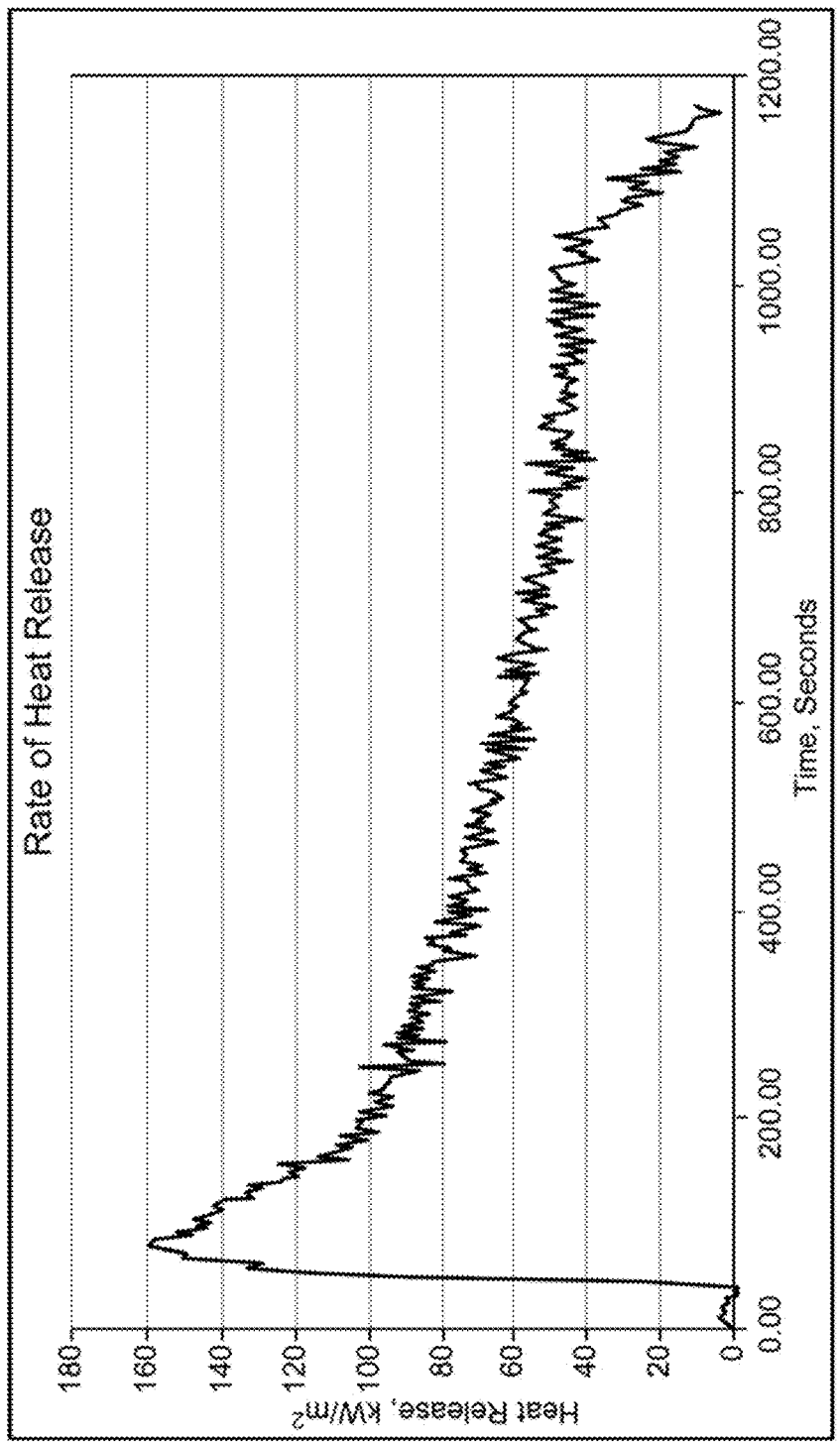
FIG. 7 shows rate of heat release of an exemplary disclosed formulation.
Figure 8:
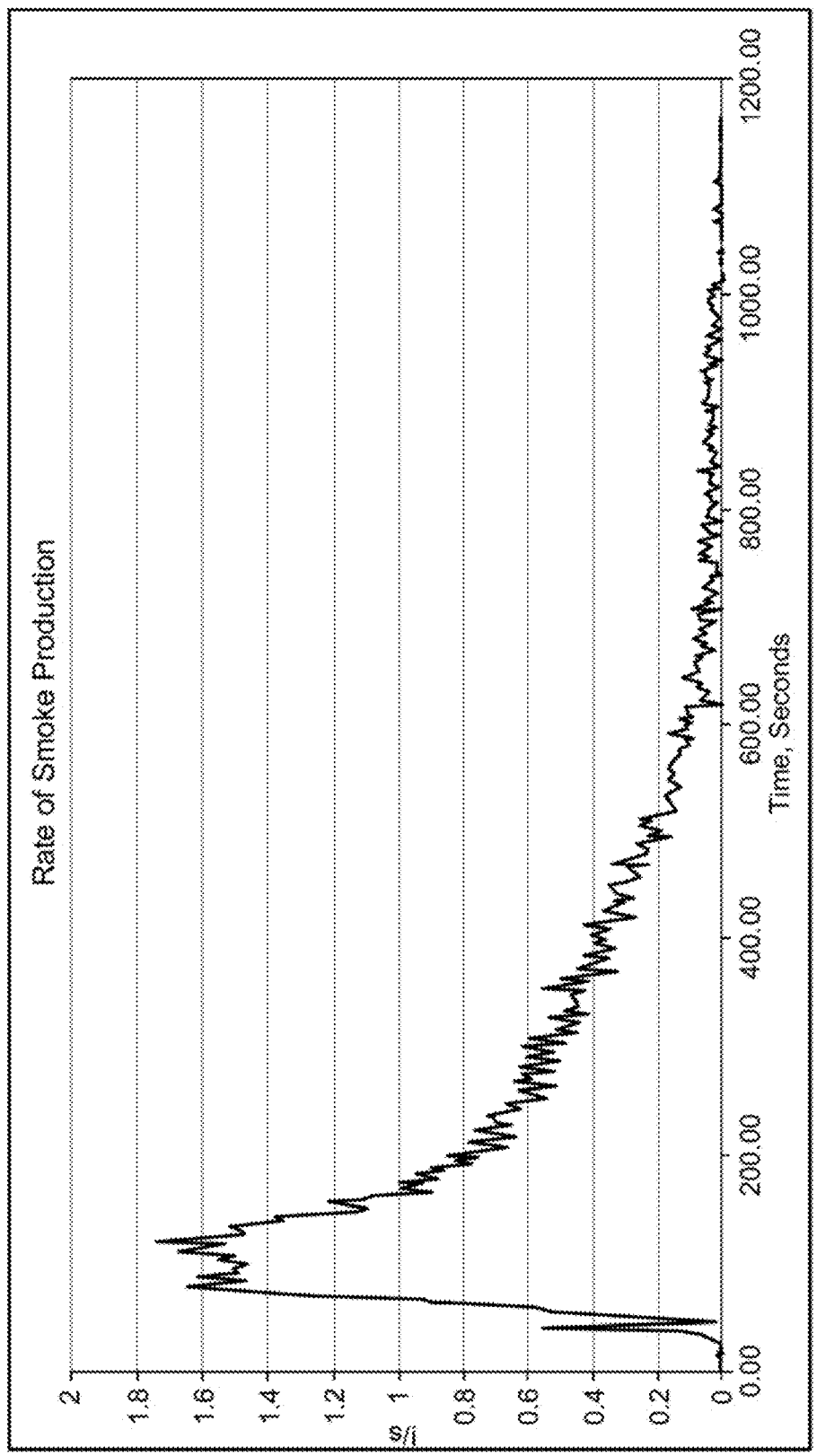
FIG. 8 shows rate of smoke production of an exemplary disclosed formulation.

Cone Data Table of a Disclosed Formulation (SEE ALSO FIGS. 7-8)

|  |  | Sample 1 | Sample 2 |
|---|---|---|---|
| Heat Flux | kW/m² | 50 | 50 |
| Time to Sustained Ignition | seconds | 42.0 | 41.6 |
| Peak Rate of Heat Release | kW/m² | 157 | 166 |
| Time of Peak RHR | seconds | 84 | 81 |
| Initial Mass | g | 49.3 | 49.6 |
| Final Mass | g | 22.63 | 22.57 |
| Avg Mass Loss Rate (10% to 90%) | g/m²s | 2.5 | 2.6 |
| Avg SEA | m²/kg | 137.08 | 128.51 |
| ISO 5660 Total Smoke | m²m² | 366 | 347 |
| Normalized Smoke | smk/gr | 7.4 | 7.0 |

TABLE 9

Other Compositions

| 0.46 lb batches | SG | Compound 1 % | Compound 1 grams | Compound 2 % | Compound 2 grams | Compound 3 % | Compound 3 grams | Compound 4 % | Compound 4 grams | Compound 5 % | Compound 5 grams |
|---|---|---|---|---|---|---|---|---|---|---|---|
| Pro-Fax 8623 | 0.9 | 32.40% | 67.7 | 30.40% | 63.5 | 28.40% | 59.3 | 26.40% | 55.1 | 24.40% | 51.0 |
| LyondelBasell DP8310M PB-1 | 0.897 | 0.00% | 0.0 | 2.00% | 4.2 | 4.00% | 8.4 | 6.00% | 12.5 | 8.00% | 16.7 |
| Zerogen ® 100 SP | 2.4 | 60.00% | 125.3 | 60.00% | 125.3 | 60.00% | 125.3 | 60.00% | 125.3 | 60.00% | 125.3 |
| Firebrake ® ZB-XF ZnBorate | 3.64 | 7.00% | 14.6 | 7.00% | 14.6 | 7.00% | 14.6 | 7.00% | 14.6 | 7.00% | 14.6 |
| Irgnox ® 1010 | 1.15 | 0.30% | 0.6 | 0.30% | 0.6 | 0.30% | 0.6 | 0.30% | 0.6 | 0.30% | 0.6 |
| Irgafos ® 168 | 1.03 | 0.30% | 0.6 | 0.30% | 0.6 | 0.30% | 0.6 | 0.30% | 0.6 | 0.30% | 0.6 |
|  |  |  | 0 |  | 0 |  | 0 |  | 0 |  | 0 |
|  |  |  | 0 |  | 0 |  | 0 |  | 0 |  | 0 |
|  |  |  | 0 |  | 0 |  | 0 |  | 0 |  | 0 |
| Total |  | 100% | 209 | 100% | 209 | 100% | 209 | 100% | 209 | 100% | 209 |
|  | Calculated SG | 1.575 |  | 1.575 |  | 1.575 |  | 1.575 |  | 1.575 |  |

Sequence of experimental compounding:
Compound 1 (a formulation) first, then 2, then test MF at 230° C., 2.16 kg, then compound 5 (eliminate 5 if MF of 2 is above 2)
Target MF is 0.5 to 2.0, ideal is 0.5 to 1.0

Other Embodiments

The foregoing description discloses only exemplary embodiments of the invention.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the appended claims. Thus, while only certain features of the invention have been illustrated and described, many modifications and changes occur to those skilled in the art. It is therefore to be understood that the appended claims are intended to cover all such modifications and changes as fall within the true spirit of the invention.

What is claimed is:

1. An article of manufacture comprising a flame-retardant thermoplastic resin composition comprising about 20% to about 30% by weight polypropylene; about 50% to about 65% by weight Magnesium Hydroxide; and about 3% to about 8% by weight polybutene, wherein said article of manufacture is a plastic connector in heating, ventilation, and air conditioning (HVAC) duct assembly or a plastic plenum conduit, wherein said article of manufacture has the following characteristics:
   a. A peak rate of heat release of 100 kW or less;
   b. A peak normalized optical density of 0.50 or less; and
   c. An average normalized optical density of 0.15 or less.

2. An article of manufacture comprising a flame-retardant thermoplastic resin composition comprising about 20% to about 30% by weight polypropylene; about 50% to about 65% by weight Magnesium Hydroxide; and about 3% to about 8% by weight polybutene, wherein said article of manufacture is an insulated cable, an insulated electric wire, or a wiring harness, wherein said article of manufacture has the following characteristics:
   a. A peak rate of heat release of 100 kW or less;
   b. A peak normalized optical density of 0.50 or less; and
   c. An average normalized optical density of 0.15 or less.

3. A method of making a flame-retardant article of manufacture, comprising preparing a flame-retardant article of manufacture using a flame-retardant thermoplastic resin composition comprising about 20% to about 30% by weight polypropylene; about 50% to about 65% by weight Magnesium Hydroxide; and about 3% to about 8% by weight polybutene, wherein said article of manufacture is a plastic connector in heating, ventilation, and air conditioning (HVAC) duct assembly or a plastic plenum conduit, wherein said article of manufacture has the following characteristics:
   a. A peak rate of heat release of 100 kW or less;
   b. A peak normalized optical density of 0.50 or less; and
   c. An average normalized optical density of 0.15 or less.

4. A method of making a flame-retardant article of manufacture, comprising preparing a flame-retardant article of manufacture using a flame-retardant thermoplastic resin composition comprising about 20% to about 30% by weight polypropylene; about 50% to about 65% by weight Magnesium Hydroxide; and about 3% to about 8% by weight polybutene, wherein said article of manufacture is an insulated cable, an insulated electric wire, or a wiring harness, wherein said article of manufacture has the following characteristics:
- a. A peak rate of heat release of 100 kW or less;
- b. A peak normalized optical density of 0.50 or less; and
- c. An average normalized optical density of 0.15 or less.

* * * * *